Patented Sept. 10, 1940

2,214,527

UNITED STATES PATENT OFFICE 2,214,527

ALKALI METAL SALTS OF THE ACETALDEHYDE BISULPHITE COMPOUND OF SULPHANILAMIDE

Arthur George Green, Walton-on-Thames, and Myer Coplans, Hendon, London, England No Drawing. Application January 18, 1940, Serial No. 314,560

4 Claims. (Cl. 260—510)

This invention relates to the preparation of new organic compounds having high therapeutic bactericidal activity accompanied by low toxicity and ready solubility.

This invention has as an object the preparation of new organic compounds. A further object is the preparation of compounds of controlled stability. A further object is the preparation of derivatives of sulphanilamide of improved properties. Other objects will appear hereinafter.

In previous publications, e. g., J. Soc. Dyers Colourists, 44 5–10 (1928), we have proposed a method for the detoxication of toxic drugs containing amino groups by the introduction into the amino side-chain of temporary acidic groups such as the sulphate and sulphomethyl radicals, thus giving rise to labile acidic salts capable of slowly regenerating the parent drug within the system, and exerting a controlled bactericidal or bacteriostatic action without materially harming the defenses of the body. This principle was first applied by us to triphenylmethane dyestuffs and to amino derivatives of acridine (see also Brit. Pat. No. 29,189, of Nov. 2, 1927).

When we endeavored to apply this principle to the detoxication of para-aminobenzenesulphonamide ("Sulphanilamide") which suffers from the disadvantage of producing more or less severe toxic symptoms when administered in medicinal doses, the sulphomethyl derivatives of sulphanilamide, obtained by reacting the latter with formaldehyde bisulphite, had too great a stability and exerted little therapeutic effect, passing through the body mainly unaltered.

We have now discovered that the compounds prepared, e. g., by the action of alkali metal acetaldehyde bisulphite compounds or by the consecutive or simultaneous reaction of acetaldehyde and an alkali metal bisulphite upon para-aminobenzenesulphonamide are considerably less stable than the lower homologs, possess strong internal bactericidal properties, accompanied by a relatively low degree of toxicity. Moreover, the sodium salt is extremely soluble in water and therefore well suited for administration by alimentary canal or parenterally by injection. These advantages were first demonstrated upon immature rabbits infected with typhoid and paratyphoid organisms and upon albino mice infected with strains of streptococcus productive of septicaemia and puerperal fever (Medical Research Council's National Collection of Type Cultures). They have since been fully confirmed in clinical practice.

These compounds, which are believed to have the formula

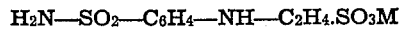

and which we term the alkali metal salts of N-(sulphoethyl) sulphanilamide, are also thought to have the more specific formula

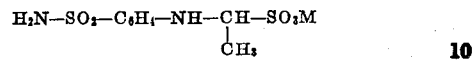

in which case they are more accurately designated as alkali metal alpha-(para-sulphamyl phenylamino) ethanesulphonates. The symbol M in both formulas is of course the alkali metal.

The sodium salt of the N-(sulphoethyl) sulphanilamide, as already indicated, can be prepared by reacting para-aminobenzenesulphonamide with acetic aldehyde followed by sodium bisulphite. Alternatively, it can be made from the amide and a mixture or compound of acetic aldehyde and sodium bisulphite. The potassium or other alkali metal salt is obtained similarly by using the corresponding alkali bisulphite. The method of preparation is illustrated by the following example which is illustrative only and not limitative:

To 170 g. of sodium bisulphite solution (sp. gr. 1.34=39%) contained in a closed flask cooled by ice, there is slowly added from a tap-funnel 30 g. of acetic aldehyde. To this solution is then added 103 g. of para-aminobenzenesulphonamide in fine powder. The mixture is heated slowly upon the water-bath to about 80° C. when a clear solution will have been obtained. Upon cooling the product remains as a syrupy solution. This may be employed as such or the solution may be evaporated preferably in vacuo, and the product thus obtained as a crystalline powder. When required for intravenous injection the syrupy solution can be sterilized by heating to the boiling point and after cooling, diluting with cold sterilized water.

The above description and example are intended to be illustrative only. Any modification of or variation therefrom which conforms to the spirit of the invention is intended to be included within the scope of the claims.

What is claimed is:

1. Process for the manufacture of products having valuable therapeutic properties which comprises reacting an alkali metal acetaldehyde bisulphite with para-aminobenzenesulphonamide.

2. Process for the manufacture of products having valuable therapeutic properties which comprises reacting sodium acetaldehyde bisulphite with p-aminobenzenesulphonamide.

3. A crystalline product substantially identical with that obtained by reacting an aqueous solution of an alkali metal acetaldehyde bisulphite in slight excess with sulphanilamide at 80° C. until a clear solution is obtained, said product having the probable formula

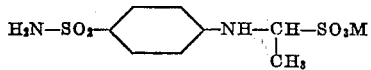

wherein M is an alkali metal, being soluble in water and having strong internal bactericidal properties accompanied by a low degree of toxicity.

4. A crystalline product substantially identical with that obtained by reacting an aqueous solution of sodium acetaldehyde bisulphite, in slight excess, at 80° C. until a clear solution is obtained with sulphanilamide, said product having the probable formula

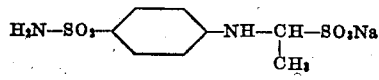

being soluble in water and having strong internal bactericidal properties accompanied by a low degree of toxicity.

ARTHUR GEORGE GREEN.
MYER COPLANS.